May 27, 1969   J. B. NICOLAS   3,446,371
APPARATUS FOR LOADING A STORAGE ENCLOSURE
Filed Feb. 23, 1967   Sheet 1 of 5

United States Patent Office 3,446,371
Patented May 27, 1969

3,446,371
APPARATUS FOR LOADING A STORAGE
ENCLOSURE
Jean Bernard Nicolas, 11 Ave. Jean Jaures,
89, Auxerre, France
Filed Feb. 23, 1967, Ser. No. 618,135
Claims priority, application France, Feb. 25, 1966,
51,215
Int. Cl. B65g 37/00, 15/02; A01f 25/00
U.S. Cl. 214—17         9 Claims

ABSTRACT OF THE DISCLOSURE

In a plant for storing grass in a cylindrical barn, said grass, poured in bulk through a spout disposed axially in the barn roof, drops onto the inner end of a radial horizontal conveyor by which it is driven toward the periphery of said barn in a direction which can be varied by rotating said conveyor about the barn axis. The grass is dropped from said conveyor laterally, at a variable distance from the vertical barn axis, by an endless belt supported by a carriage displaceable along the conveyor, said belt being vertical and running in a direction perpendicular to the radial direction of the conveyor.

---

The present invention relates to methods and apparatus for garnering a covered enclosure with a fibrous material in bulk, such as grass.

The object of this invention is to improve the efficiency of garnering methods and plants and also, possibly, to permit evacuation of the material from the enclosure.

The method according to the present invention comprises the following steps:

Lifting the material by means of at least one oblique mechanical conveyor up to the roof of the enclosure, Dropping it onto a mechanical conveyor, at least approximately horizontally mounted in the enclosure, Conveying it along said horizontal conveyor to a variable distance in said enclosure and Dropping it laterally from the horizontal conveyor at variable distances from the point where it has dropped onto said horizontal conveyor.

The plant according to the present invention for carrying out this method in the upper part of the enclosure, above the space into which the material is to be dropped, an approximately horizontal mechanical conveyor and, on this conveyor, a carriage movable at will along the frame of the mechanical conveyor, said carriage supporting means, preferably consisting of an endless belt driven by a motor and extending edgewise transversely to the horizontal conveyor, for stopping the material along the conveyor and evacuating it laterally from said conveyor.

When, as usual, said enclosure is of cylindrical shape having a vertical axis, the frame of the horizontal mechanical conveyor extends radially at the top of said enclosure and can be rotated about said axis, its inner end being located under a fixed vertical spout, extending also along said axis, through which the material is poured onto the horizontal conveyor inner end.

Such a plant permits of garnering the cylindrical enclosure in a uniform manner.

If the enclosure has a bottom floor located above the ground and there is provided, about the above mentioned axis, a shaft for evacuation of the material stored in the enclosure, the conveyor is advantageously supported by the radial frame thereof through adjustable means which permit of lowering it gradually down to the level of said floor, whereby the under portion of the mechanical conveyor provided with scraper ribs can move the material in the enclosure toward said shaft, through which it is evacuated.

Preferred embodiments of the present invention will be hereinafter described with reference to the appended drawings, given merely by way of example, and in which.

Figure 3:
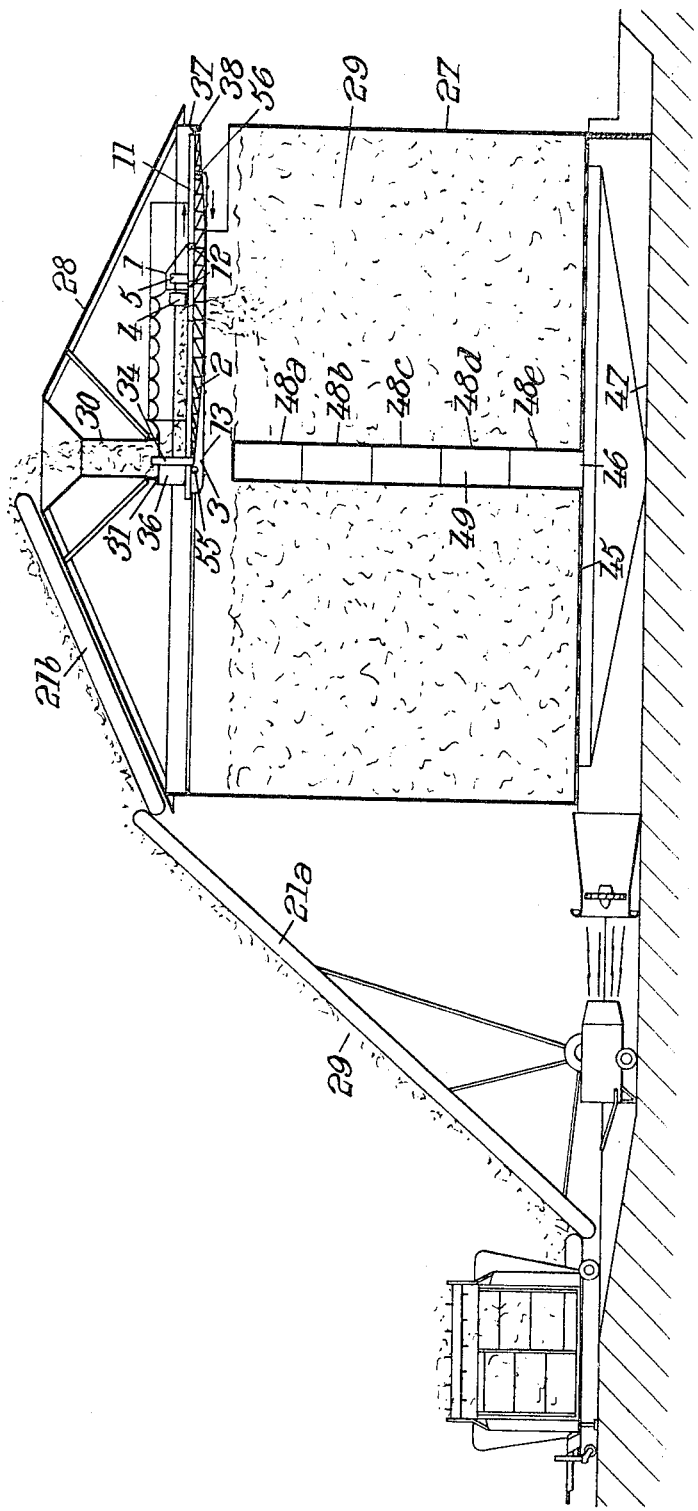
Figure 4:
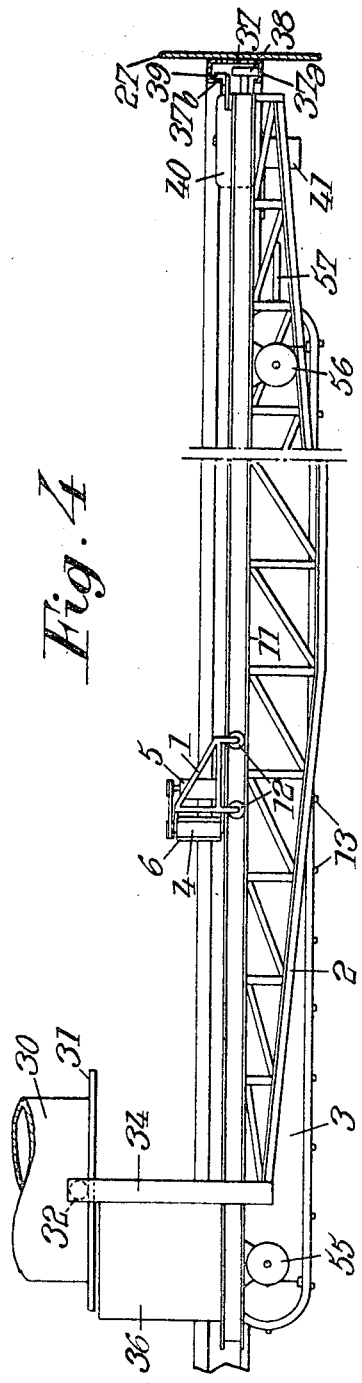
Figure 5:
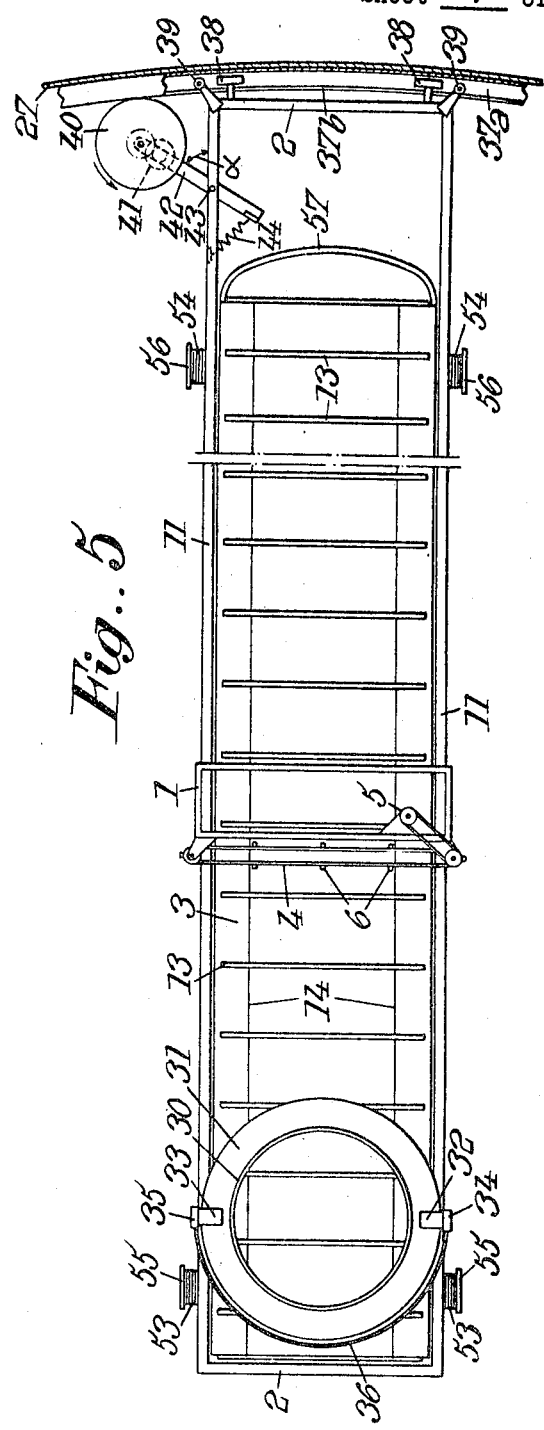

FIG. 3 diagrammatically shows, partly in axial section and partly in elevational view, a plant according to another embodiment of this invention;

FIG. 4 is an elevational view on a larger scale of a portion of the structure illustrated by FIG. 3;

FIG. 5 is a plan view corresponding to FIG. 4; and

Figure 6:
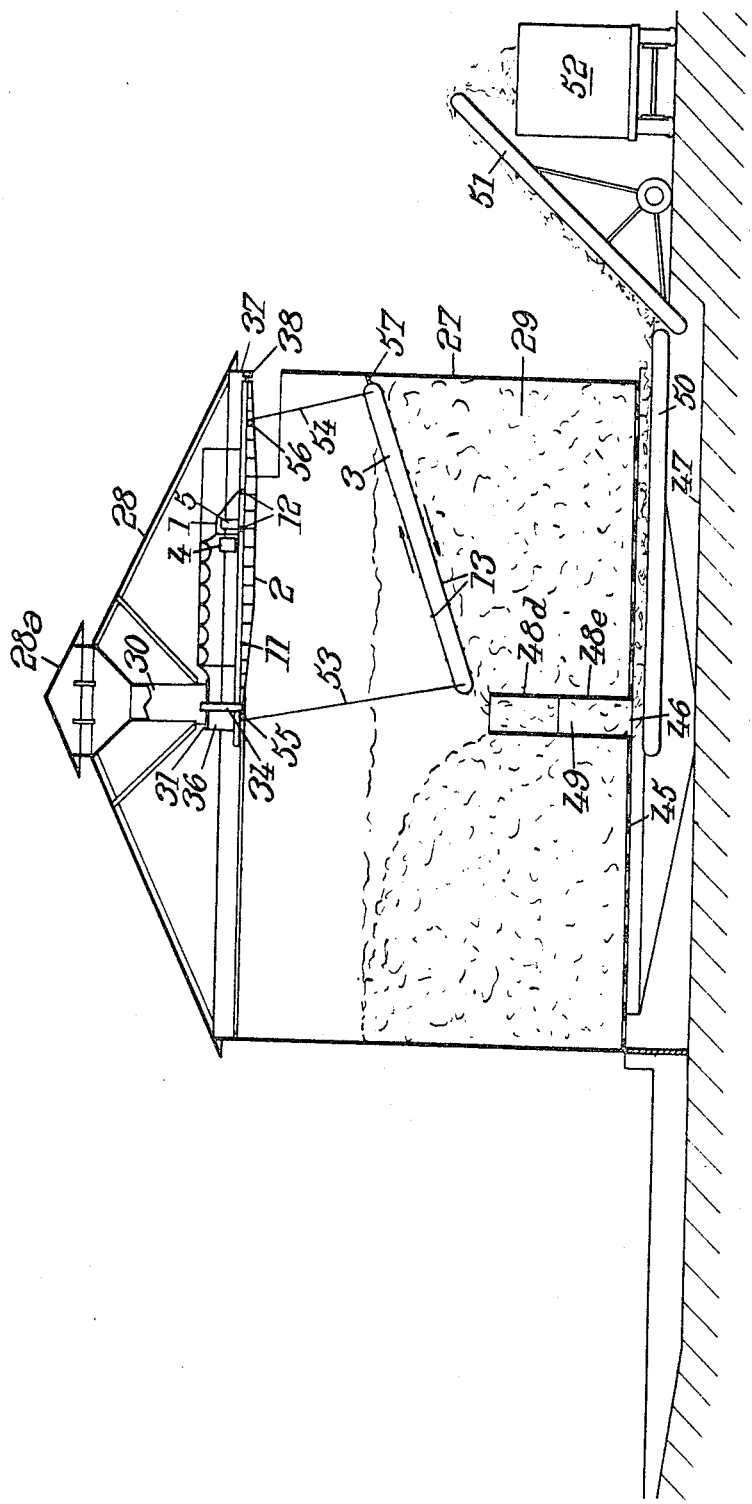

FIG. 6 illustrates the use of the plant of FIG. 3 for evacuation of the material stored in the enclosure.

When making hay, it is possible, after having cut the grass, to leave it to dry on the spot and to pack it into bundles before storing it in a barn.

However, this way of proceeding involves serious risks since the grass, after it has been cut, must remain for several days in the fields, where it may be deteriorated in case of rain.

This is why, according to another method, the grass is garnered in bulk, in a barn immediately after it has been cut and it is made to dry in the barn by means of air streams passing through the material.

It has already been proposed to garner the grass in the barn by means of pneumatic conveyors, but, as the flow rate is often irregular and as the material may be packed in an irregular manner in the conveyor, it is necessary to use very powerful blowers for obtaining a relatively low rate of work.

Furthermore, it is often difficult to bring the output orifice of the conveyor into different directions so that it can uniformly fill the storing area of the barn.

According to the present invention, I make use of a mechanical conveyor for feeding grass above the middle portion of a storing area and I provide on said conveyor a carriage 1, movable along the fixed frame 2 of the conveyor and provided, above the supporting surface 3 of the conveyor, with means capable of laterally dropping the material that is being carried by the conveyor.

In the embodiment illustrated by the drawings, such means consists of an endless belt 4 driven by an electric motor 5 and extending transversely and edgewise above the surface 3 of the conveyor.

Advantageously, as shown, belt 4 is provided, on the outer face thereof, with transverse ribs 6.

At the ends of belt 4, are provided, above the upper edge of said belt, deflectors 7 adjustably carried by carriage 1 at the ends of a cover 8 extending above belt 4. Said cover 8 may be provided with an oblique extension 8a for guiding the material toward the active portion of belt 4.

On carriage 1 there is mounted a lever 9 for adjusting the inclination of deflectors 7.

Motor 5 is provided with a reversing gear, not shown by the drawings.

Furthermore, means, not shown by the drawing and of any known type, may be provided for varying the speed of belt 4.

Said means may, for instance, consist of a rheostat inserted in the feed circuit of motor 5 or of a trapezoidal belt variator, inserted between motor 5 and the driving roller 10 of belt 4.

The fixed frame of the conveyor comprises two lateral girders 11 forming rails for the rollers 12 of carriage 1, along which rails the carriage can be moved or stopped at will.

Figure 1:
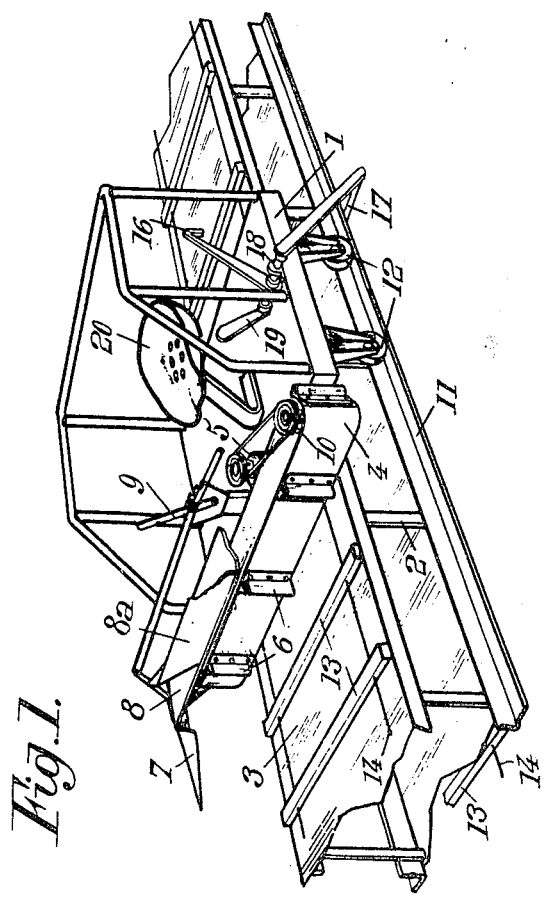
FIG. 1 is a perspective diagrammatic view of a portion of the present invention.
Figure 2:
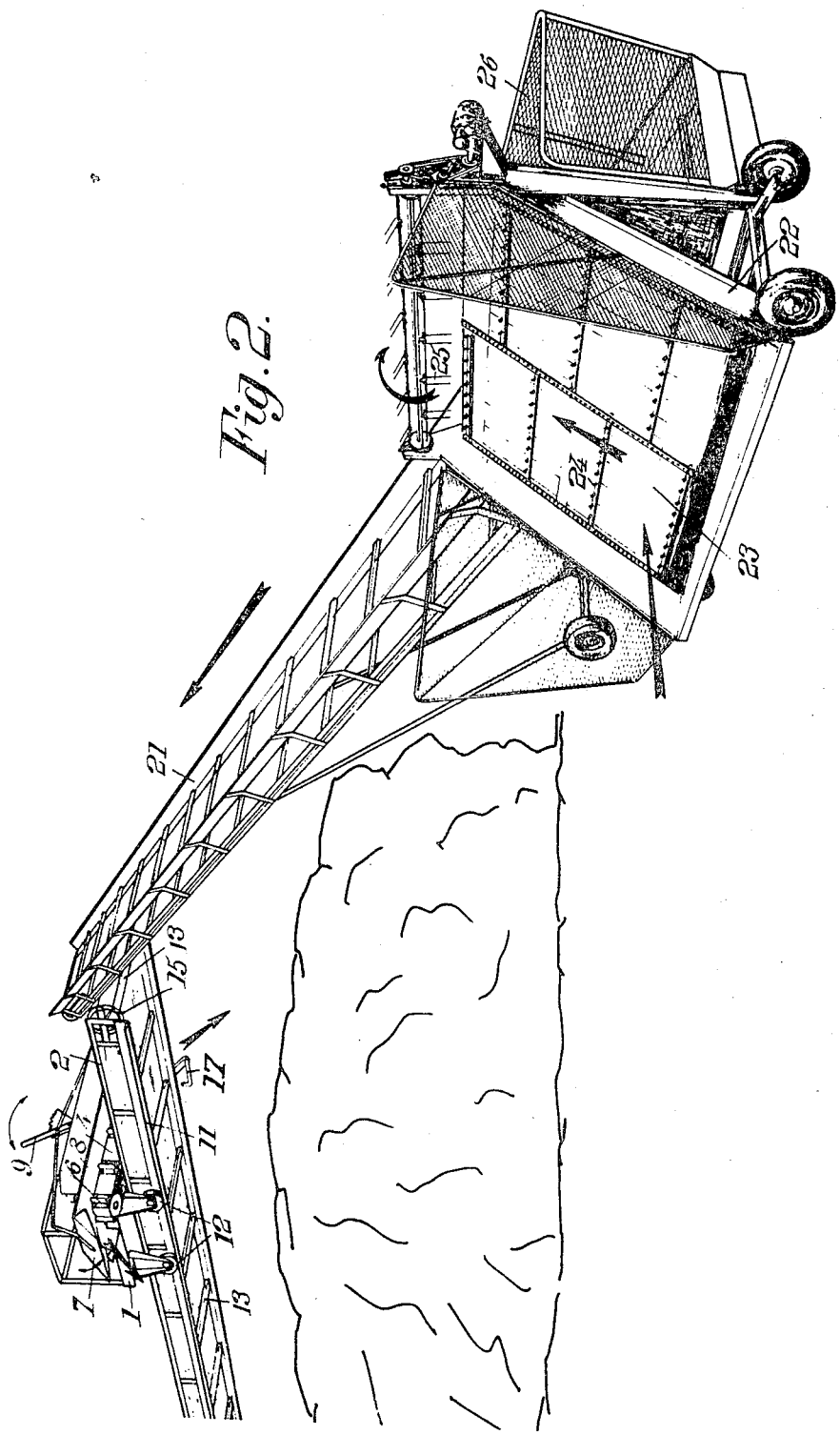
FIG. 2 is also a perspective view but on a smaller scale of a portion of the plant according to a first embodiment of the invention.

The horizontal conveyor comprises a supporting strip made of sheet iron and forming a loop along which are movable transverse scraper rods 13 which are secured at a distance from one another to two metallic cables 14 which, at the ends of the conveyor, pass over driving pulleys 15 (FIG. 2) actuated through any suitable means not visible on the drawings.

Carriage 1 is further provided with means for moving it in either direction along rails 11.

Such means may consist of a motor capable of driving the carriage through one of the rollers 12.

But, according to the embodiment shown by the drawings, carriage 1 is provided with means for securing it to one or the other of the portions of cables 14 located respectively on the upper side and on the lower side of frame 2.

These means consist of hooked arms 16 and 17 rigid with a shaft 18 journalled in carriage 1 and adapted to be rotated in one direction or the other by means of a lever 19 capable of occupying three positions, to wit:

A first position in which the hook of lever 16 is applied against one of the scraper ribs 13 running on the upper portion of strip 3;

A second position wherein the hook of lever 17 is brought into contact with a scraper rib 13 running on the under portion of strip 3; and A third position, intermediate between the two above mentioned ones, wherein both of the levers 16 and 17 have their hooks out of contact with the scraper ribs running on strip 3. In this case carriage 1 is stationary with respect to the frame of the conveyor and may be fixed by means of a brake, not shown.

Carriage 1 is provided with a seat 20 for the driver in such manner that he can actuate levers 9 and 19 and also control means for reversing motor 5 and adjusting the drive of this motor.

These controls may also be operated through electric or radio electric means.

The stationary frame 2 of the conveyor may be mounted in a permanent or removable manner in a barn, this frame being at least approximately horizontal.

Conveyor 2 is fed with grass or other material through an oblique elevator 21 fed through means 23, 24, 25 and 26.

This plant works as follows:

The material to be stored, fed against oblique board 23, is moved upwardly upon said board by toothed scrapers 24 and poured into basket 26 after passage through a kind of sprocket wheel 25.

Oblique elevator 21, the lower end of which projects into basket 26, lifts the material onto conveyor 2 which conveys it to the belt 4 of carriage 1.

This belt ejects the material on one side of the conveyor.

By displacing carriage 1 along conveyor 2 and by adjusting the inclination of deflector 7 and also possibly by varying the speed of displacement of belt 4, it is possible to distribute over a relatively large storing area a uniform layer of material, such as grass.

A mechanical conveyor of the type above described is particularly advantageous in a plant adapted to store the material in a cylindrical enclosure 27 provided with a roof 28, as shown by FIGS. 3 and 6.

In this case, the material 29 is lifted by means of oblique mechanical conveyors 21a and 21b up to the center of roof 28.

The material is poured through an axial spout 30 carried by roof 28 onto mechanical conveyor 2–3 mounted in substantially horizontal position and radially in the top part of enclosure 27.

This material 29 is driven by the horizontal conveyor from the lower end of spout 30 toward the periphery of enclosure 27.

It is ejected in a direction transverse to conveyor arm 3 at variable distances from spout 30.

The areas wherein grass 29 is dropped in enclosure 27 are modified, as grass 29 is being fed, by rotating the radial conveyor about the vertical axis of spout 30.

After enclosure 27 has been filled with material, oblique conveyors 21a and 21b are removed and the top end of spout 30 is closed by a cover 28a which may be adapted to permit the passage of venting air (FIG. 6).

The axial vertical spout 30 is provided at its lower end with a flange 31 acting as pivot for one of the ends of the supporting frame 2 of the conveyor. This flange 31 constitutes a roller track for two rollers 32 and 33 journalled, about a diameter of spout 30, in the upper ends of vertical arms 34 and 35 secured at their lower ends to frame 2.

Frame 2 further carries a U-shaped deflector 36 fixed to arms 34 and 35 and in line with axial spout 30. At its other end, frame 2 bears upon a circular rail 37 carried by the cylindrical wall 27 at the top thereof.

This circular rail 37 forms a horizontal roller track 37a and a vertical roller track 37b for rollers 38 and 39 journalled in frame 2, rollers 38 running on roller track 37a, to support the outer end of frame 2, whereas rollers 39 run along roller track 37b to be applied against a flange parallel to the cylindrical wall of enclosure 27, thus preventing frame 2 from moving away from said cylindrical wall.

Rollers 39 thus keep the common axis of rollers 32 and 33 in substantially diametral position with respect to annular flange 31. However some slight relative displacements are possible if, due to some deformation, flange 31 is no longer coaxial with respect to enclosure 27.

In order to rotate frame 2 about the vertical axis of spout 30 there is provided a friction driving wheel 40 having a vertical axis and applied against the inner face of the cylindrical wall of enclosure 27, as a matter of fact against the inner face of the circular rail 37 carried by said enclosure.

This wheel 40, with its electric driving motor 41, is carried by a lever 42 pivotally supported by frame 2 about a vertical axis 43. This lever 42 makes, with the longitudinal axis of frame 2, an acute angle $\alpha$, lever 42 being urged about axis 43 by a spring 44.

In the embodiment ilustrated by FIG. 3 where angle $\alpha$ decreases if lever 42 pivots in the clockwise direction about axis 43, driving wheel 40 must rotate in the anticlockwise direction. It follows that the action of wheel 40 is such as to urge lever 42 to turn in the direction where it tends to be applied through wheel 30, against the cylindrical wall of enclosure 27, thus improving the adhesion of wheel 40 against said cylindrical wall.

When, as shown by the drawings, the floor 45 of enclosure 27 is located at some distance above the ground, this floor is provided at its center with a hole 46 from which starts upwardly an axial shaft 49. This arrangement permits a vertical downward evacuation of the material in enclosure 27 through said shaft 49 and then through the horizontal space left between floor 45 and the ground 47 under said floor.

Shaft 49 is made of portions 48a, 48b, 48c, 48d, 48e fitted in one another and removable toward the top. These shaft portions are removed as the top level of the material in enclosure 27 moves gradually in the downward direction.

For this purpose, the horizontal conveyor is supported by its frame 2 through means, such as cables 53 and 54, which permit of gradually lowering said conveyor as the top level of the material in enclosure 27 moves down. Scraper ribs 13, thus placed in contact with the material in enclosure 27, move said material from the periphery of enclosure 27 toward axial shaft 49 through which said material is evacuated.

It will be noted that the active elements of the conveyor are moved with respect to their support 3 in the same direction for evacuation of the material as it was used for garnering the enclosure with said material.

In the space between floor 45 and the ground 47 there is provided, as shown by FIG. 6, a conveyor 50 which evacuates the material dropping through hole 46 to the peripheral area on the outside of the cylindrical wall of enclosure 27, where an oblique conveyor 51 feeds it into a carriage 52. The means for lowering the support 3 of the conveyor with respect to frame 2 consist of cables 53, 54 the lower ends of which are secured to strip 3 and the upper ends of which are wound on winches 55 and 56, respectively.

Conveyor strip 3 is provided at its end with a buffer 57 adapted to bear against the inner surface of the cylindrical wall of enclosure 27 when the material is evacuated, as shown by FIG. 6.

In a general manner, while the above description discloses what are deemed to be practical and efficient embodiments of the present invention, said invention is not limited thereto as there might be changes made in the arrangement, disposition and form of the parts without departing from the principle of the invention.

What I claim is:

1. A plant for garnering a covered enclosure with a fibrous material in bulk which comprises, in combination,
    a lifting conveyor for continuously lifting said material from the ground to the top part of said enclosure,
    a support extending horizontally at the top part of said enclosure,
    endless conveyor means carried by said support and having a substantially horizontal surface adapted to receive material from the top of said lifting conveyor and adapted to move said material along said support,
    a carriage movably carried by said support,
    means for moving said carriage along said support, independently of movement of said endless conveyor means,
    means on said carriage for transversely ejecting said material from said conveyor means at different points thereof, and
    means for changing the position of said support with respect to said enclosure.

2. A plant for garnering a covered enclosure with a fibrous material in bulk which comprises, in combination,
    a lifting conveyor for continuously lifting said material from the ground to the top part of said enclosure,
    a support extending horizontally at the top part of said enclosure,
    endless conveyor means carried by said support and having a substantially horizontal surface adapted to receive material from the top of said lifting conveyor and adapted to move said material along said support,
    a carriage movably carried by said support,
    means for moving said carriage along said support, independently of movement of said endless conveyor means,
    means on said carriage for transversely ejecting said material from said conveyor means at different points thereof, and
    means for changing the position of said support with respect to said enclosure;
    wherein said support comprises:
    an elongated supporting frame and
    a strip carried by said frame forming an elongated loop the upper and under surfaces of which are horizontal and extend along the length of said support,
    said material ejecting means comprising:
    an endless belt mounted on said carriage having its main surfaces at substantially right angles to the upper surface of said strip and transverse to the direction in which said frame and said strip extend,
    ribs fixed to said endless belt and perpendicular to the upper surface of said strip, and
    a motor supported by said carriage for driving said endless belt.

3. A plant according to claim 2 wherein said horizontal conveyor means consist of an endless structure movable on said strip along the loop formed by it,
    said means for moving said carriage along said support comprising:
    clutch means for coupling said carriage with the portion of said endless structure that is running along the upper surface of said strip,
    clutch means for coupling said carriage with the portion of said endless structure that is running along the under surface of said strip,
    said two clutch means being interconnected so that when one of them is engaged the other one is disengaged,
    said two clutch means being adapted to be both disengaged simultaneously, and
    control means on said carriage for operating said clutch means.

4. A plant according to claim 3 wherein the endless structure forming said conveyor means comprise:
    endless cables extending longitudinally along the loop formed by said strip, and
    scraper ribs secured to said cables and extending transversely thereto,
    said clutch means consisting of hooked arms pivoted on said carriage and adapted to engage said ribs.

5. A plant according to claim 2 further comprising adjustable deflector means mounted on said carriage for varying the rate at which material is dropped from said support.

6. A plant according to claim 1 wherein said material ejecting means comprises:
    an endless belt mounted on said carriage having its main surfaces at substantially right angles to the upper surface of said strip and transverse to the direction in which said frame and said strip extend,
    ribs fixed to said endless belt and perpendicular to the upper surface of said endless conveyor means, and
    a motor supported by said carriage for driving said endless belt.

7. A plant for garnering a covered enclosure with a fibrous material in bulk which comprises, in combination,
    a lifting conveyor for continuously lifting said material from the ground to the top part of said enclosure,
    a support extending horizontally at the top part of said enclosure,
    endless conveyor means carried by said support and having a substantially horizontal surface adapted to receive material from the top of said lifting conveyor and adapted to move said material along said support,
    a carriage movably carried by said support,
    means for moving said carriage along said support, independently of movement of said endless conveyor means,
    means on said carriage for transversely ejecting said material from said conveyor means at different points thereof, and
    means for changing the position of said support with respect to said enclosure;
    said plant being for use with an enclosure of cylindrical shape having a vertical axis, wherein said support extends radially from said vertical axis and is pivotable about said axis, said plant further comprising a fixed vertical spout carried by said enclosure at the top thereof along said axis, said lifting conveyor having its top located above said spout, said means for changing the position of said support being means for rotating said support about said vertical axis;
    said plant including, carried by the cylindrical enclosure along the inner wall thereof and at the level of said support, a peripheral rail for supporting the outer end of said support;
    said rail including an annular horizontal roller track portion and a cylindrical vertical roller track portion,
    said plant including rollers journalled to said support at the outer end thereof, respectively about horizontal and vertical axes, adapted to co-operate with said roller track portions respectively;

said means for rotating said support about said vertical axis comprising a driving wheel carried by said support at the outer end thereof and rotatable about a vertical axis and bearing frictionally against the inner cylindrical wall of said enclosure;

said plant including, to support said driving wheel, a lever pivoted to the outer end of said support about a vertical axis and making an acute angle with the radial direction of said support and spring means acting on said lever for urging said wheel against said enclosure inner wall.

8. For use with an enclosure of cylindrical shape having a vertical axis and having a bottom floor above the ground, a plant according to claim 2:

wherein said support extends radially from said vertical axis and is pivotable about said axis, said plant further comprising a fixed vertical spout carried by said enclosure at the top thereof along said axis, said lifting conveyor having its top located above said spout, said means for changing the position of said support being means for rotating said support about said vertical axis;

wherein said support comprises an elongated supporting frame and a metal strip carried by said frame forming an elongated loop the upper and under surfaces of which are horizontal and extend along the length of said support and said conveyor means comprise endless cables extending longitudinally along the loop formed by said strip, and scraper ribs secured to said cables and extending transversely thereto, said plant further comprising:

a cylindrical shaft coaxial with said cylindrical enclosure extending upwardly from said bottom floor and open at its bottom end, said shaft being made of a superposition of sections detachable from one another, and means for adjustably connecting the ends of said metal strip with said supporting frame whereby said metal strip can be lowered vertically with respect to said supporting frame to bring said scraper ribs into contact with the fibrous material in said enclosure in order to bring it toward said shaft, through which it is evacuated.

9. A plant according to claim 8 further including a buffer carried by the outer end of said strip to bear against the cylindrical wall of said enclosure when said strip is lowered.

References Cited

UNITED STATES PATENTS

| | | |
|---|---|---|
| 772,956 | 10/1904 | Patterson. |
| 2,721,665 | 10/1955 | Goeke. |
| 2,758,728 | 8/1956 | Henry _____ 198—188 XR |
| 3,075,657 | 1/1963 | Hazen. |

ROBERT G. SHERIDAN, *Primary Examiner.*

U.S. Cl. X.R.

198—89, 100, 101, 188